(12) United States Patent
Konings

(10) Patent No.: US 7,322,547 B2
(45) Date of Patent: Jan. 29, 2008

(54) AEROSPACE VEHICLE LEADING EDGE SLAT DEVICES AND CORRESPONDING METHODS

(75) Inventor: Christopher A. Konings, Seattle, WA (US)

(73) Assignee: The Boeing Company, Chicago, IL (US)

( * ) Notice: Subject to any disclaimer, the term of this patent is extended or adjusted under 35 U.S.C. 154(b) by 104 days.

(21) Appl. No.: 11/048,320

(22) Filed: Jan. 31, 2005

(65) Prior Publication Data
US 2006/0169847 A1 Aug. 3, 2006

(51) Int. Cl.
*B64C 3/50* (2006.01)

(52) U.S. Cl. .................................................... 244/214

(58) Field of Classification Search ............. 244/35 R, 244/198, 201, 213, 214
See application file for complete search history.

(56) References Cited

U.S. PATENT DOCUMENTS

| | | | |
|---|---|---|---|
| 1,724,456 A | * | 8/1929 | Crook ........................ 244/203 |
| 1,770,575 A | | 7/1930 | Ksoll |
| 1,913,169 A | * | 6/1933 | Martin ....................... 244/198 |
| 2,086,085 A | | 7/1937 | Lachmann et al. |
| 2,169,416 A | | 8/1939 | Griswold |
| 2,282,516 A | | 5/1942 | Hans et al. |
| 2,289,704 A | | 7/1942 | Grant |
| 2,319,383 A | | 5/1943 | Zap |
| 2,347,230 A | | 4/1944 | Zuck |
| 2,358,985 A | | 9/1944 | McAndrew |
| 2,378,528 A | | 6/1945 | Arsandaux |
| 2,383,102 A | | 8/1945 | Zap |
| 2,385,351 A | | 9/1945 | Davidsen |
| 2,387,492 A | | 10/1945 | Blaylock et al. |
| 2,389,274 A | | 11/1945 | Pearsall et al. |
| 2,406,475 A | | 8/1946 | Rogers |
| 2,422,296 A | | 6/1947 | Flader et al. |
| 2,444,293 A | | 6/1948 | Holt |

(Continued)

FOREIGN PATENT DOCUMENTS

DE 387833 1/1924

(Continued)

OTHER PUBLICATIONS

Drella, Mark, "Design and Optimization Method for Multi-Element Airfoils," MIT Department of Aeronautics and Astronautics, pp. 7 and 9, figures 3, 7, and 8.

(Continued)

*Primary Examiner*—Timothy D. Collins
(74) *Attorney, Agent, or Firm*—Perkins Coie LLP

(57) ABSTRACT

Aerospace vehicle leading edge slat devices and corresponding methods are generally disclosed herein. One aspect of the invention is directed toward an aerospace vehicle system that includes an airfoil having a leading edge. The system further includes a first flow body fixedly coupled to the airfoil to form at least one gap between the leading edge of the airfoil and the first flow body. A second flow body can be coupled to the airfoil and can be movable between at least a retracted position where the second flow body is positioned to at least approximately aerodynamically seal the at least one gap, and an extended position where the second flow body is positioned to allow fluid flow through the at least one gap.

25 Claims, 7 Drawing Sheets

U.S. PATENT DOCUMENTS

| | | | |
|---|---|---|---|
| 2,458,900 A | 1/1949 | Erny | |
| 2,504,684 A | 4/1950 | Harper | |
| 2,518,854 A | 8/1950 | Badenoch | |
| 2,563,453 A | 8/1951 | Briend | |
| 2,652,812 A | 9/1953 | Fenzl | |
| 2,665,084 A | 1/1954 | Feeney et al. | |
| 2,851,229 A | 9/1958 | Clark | |
| 2,864,239 A | 12/1958 | Taylor | |
| 2,877,968 A | 3/1959 | Granan et al. | |
| 2,886,008 A | 5/1959 | Geyer et al. | |
| 2,891,740 A | 6/1959 | Campbell | |
| 2,892,312 A | 6/1959 | James et al. | |
| 2,899,152 A | 8/1959 | Weiland | |
| 2,912,190 A | 11/1959 | MacDonough | |
| 2,920,844 A | 1/1960 | Marshall et al. | |
| 2,938,680 A * | 5/1960 | Greene et al. | 244/214 |
| 2,990,144 A | 6/1961 | Hougland | |
| 2,990,145 A | 6/1961 | Hougland | |
| 3,013,748 A | 12/1961 | Westburg | |
| 3,089,666 A | 5/1963 | Quenzler | |
| 3,102,607 A | 9/1963 | Roberts | |
| 3,112,089 A | 11/1963 | Dornier | |
| 3,136,504 A | 6/1964 | Carr | |
| 3,203,275 A | 8/1965 | Hoover | |
| 3,203,647 A | 8/1965 | Alvarez-Calderon | |
| 3,282,535 A | 11/1966 | Steiner | |
| 3,375,998 A | 4/1968 | Alvarez-Calderon | |
| 3,423,858 A | 1/1969 | Speno | |
| 3,447,763 A | 6/1969 | Allcock | |
| 3,463,418 A | 8/1969 | Miksch | |
| 3,504,870 A | 4/1970 | Cole et al. | |
| 3,528,632 A | 9/1970 | Miles et al. | |
| 3,539,133 A | 11/1970 | Robertson | |
| 3,556,439 A | 1/1971 | Autry et al. | |
| 3,587,311 A | 6/1971 | Hays, Jr. | |
| 3,589,648 A | 6/1971 | Gorham et al. | |
| 3,642,234 A * | 2/1972 | Kamber et al. | 244/45 A |
| 3,653,611 A | 4/1972 | Trupp et al. | |
| 3,659,810 A | 5/1972 | Robertson | |
| 3,677,504 A | 7/1972 | Schwarzier | |
| 3,704,828 A | 12/1972 | Studer et al. | |
| 3,704,843 A | 12/1972 | Jenny | |
| 3,743,219 A | 7/1973 | Gorges | |
| 3,794,276 A | 2/1974 | Maltby et al. | |
| 3,804,267 A | 4/1974 | Cook et al. | |
| 3,807,447 A | 4/1974 | Masuda | |
| 3,813,062 A | 5/1974 | Prather | |
| 3,827,658 A | 8/1974 | Hallworth | |
| 3,831,886 A | 8/1974 | Burdges et al. | |
| 3,836,099 A | 9/1974 | O'Neill et al. | |
| 3,837,601 A | 9/1974 | Cole | |
| 3,862,730 A | 1/1975 | Heiney | |
| 3,874,617 A | 4/1975 | Johnson | |
| 3,897,029 A * | 7/1975 | Calderon | 244/210 |
| 3,904,152 A * | 9/1975 | Hill | 244/214 |
| 3,910,530 A | 10/1975 | James et al. | |
| 3,913,450 A | 10/1975 | MacGregir | |
| 3,917,192 A * | 11/1975 | Alvarez-Calderon | 244/214 |
| 3,931,374 A | 1/1976 | Moutet nee Layrisse et al. | |
| 3,941,334 A | 3/1976 | Cole | |
| 3,941,341 A | 3/1976 | Brogdon, Jr. | |
| 3,949,957 A * | 4/1976 | Portier | 244/210 |
| 3,968,946 A | 7/1976 | Cole | |
| 3,985,319 A | 10/1976 | Dean et al. | |
| 3,987,983 A | 10/1976 | Cole | |
| 3,991,574 A | 11/1976 | Frazier | |
| 3,992,979 A | 11/1976 | Smith | |
| 3,993,584 A | 11/1976 | Owen et al. | |
| 3,994,451 A | 11/1976 | Cole | |
| 4,011,888 A | 3/1977 | Whelchel et al. | |
| 4,015,787 A | 4/1977 | Maieli et al. | |
| 4,106,730 A | 8/1978 | Spitzer et al. | |
| 4,117,996 A | 10/1978 | Sherman | |
| 4,120,470 A | 10/1978 | Whitener | |
| 4,131,253 A | 12/1978 | Zapel | |
| 4,146,200 A | 3/1979 | Borzachillo | |
| 4,171,787 A | 10/1979 | Zapel | |
| 4,180,222 A | 12/1979 | Thornburg | |
| 4,181,275 A | 1/1980 | Moelter et al. | |
| 4,189,120 A | 2/1980 | Wang | |
| 4,189,121 A | 2/1980 | Harper et al. | |
| 4,189,122 A | 2/1980 | Miller | |
| 4,200,253 A | 4/1980 | Rowarth | |
| 4,202,519 A | 5/1980 | Fletcher | |
| 4,240,255 A | 12/1980 | Benilan | |
| 4,262,868 A | 4/1981 | Dean | |
| 4,275,942 A | 6/1981 | Steidl | |
| 4,283,029 A | 8/1981 | Rudolph | |
| 4,285,482 A | 8/1981 | Lewis | |
| 4,293,110 A | 10/1981 | Middleton | |
| 4,312,486 A | 1/1982 | Mc Kinney | |
| 4,351,502 A | 9/1982 | Statkus | |
| 4,353,517 A | 10/1982 | Rudolph | |
| 4,358,077 A | 11/1982 | Coronel | |
| 4,360,176 A * | 11/1982 | Brown | 244/214 |
| 4,363,098 A | 12/1982 | Buus et al. | |
| 4,368,937 A | 1/1983 | Palombo | |
| 4,384,693 A | 5/1983 | Pauly et al. | |
| 4,427,168 A | 1/1984 | Mc Kinney | |
| 4,441,675 A | 4/1984 | Boehringer | |
| 4,444,368 A | 4/1984 | Andrews | |
| 4,448,375 A | 5/1984 | Herndon | |
| 4,459,084 A | 7/1984 | Clark | |
| 4,461,449 A | 7/1984 | Turner | |
| 4,471,925 A | 9/1984 | Kunz | |
| 4,471,927 A | 9/1984 | Rudolph | |
| 4,472,780 A | 9/1984 | Chenoweth et al. | |
| 4,475,702 A | 10/1984 | Cole | |
| 4,479,620 A | 10/1984 | Rogers et al. | |
| 4,485,992 A | 12/1984 | Rao | |
| 4,496,121 A | 1/1985 | Berlin | |
| 4,498,646 A | 2/1985 | Proksch | |
| 4,528,775 A | 7/1985 | Einarsson | |
| 4,533,096 A | 8/1985 | Baker et al. | |
| 4,542,869 A | 9/1985 | Brine | |
| 4,553,722 A | 11/1985 | Cole | |
| 4,575,030 A | 3/1986 | Gratzer | |
| 4,575,099 A | 3/1986 | Nash | |
| 4,576,347 A | 3/1986 | Opsahl | |
| 4,605,187 A | 8/1986 | Stephenson | |
| 4,637,573 A | 1/1987 | Perin et al. | |
| 4,650,140 A | 3/1987 | Cole | |
| 4,691,879 A | 9/1987 | Greene | |
| 4,700,911 A | 10/1987 | Zimmer | |
| 4,702,441 A | 10/1987 | Wang | |
| 4,702,442 A | 10/1987 | Weiland et al. | |
| 4,706,913 A | 11/1987 | Cole | |
| 4,712,752 A | 12/1987 | Victor | |
| 4,717,097 A | 1/1988 | Sepstrup | |
| 4,720,066 A | 1/1988 | Renken et al. | |
| 4,729,528 A | 3/1988 | Borzachillo | |
| 4,747,375 A | 5/1988 | Williams | |
| 4,784,355 A | 11/1988 | Brine | |
| 4,786,013 A | 11/1988 | Pohl | |
| 4,789,119 A | 12/1988 | Bellego et al. | |
| 4,796,192 A | 1/1989 | Lewis | |
| 4,823,836 A | 4/1989 | Bachmann et al. | |
| 4,838,503 A * | 6/1989 | Williams | 244/214 |
| 4,854,528 A | 8/1989 | Hofrichter | |
| 4,856,735 A | 8/1989 | Lotz et al. | |
| 4,867,394 A | 9/1989 | Patterson, Jr. et al. | |
| 4,892,274 A | 1/1990 | Pohl et al. | |
| 4,899,284 A | 2/1990 | Lewis | |
| 4,962,902 A | 10/1990 | Fortes | |

| | | |
|---|---|---|
| 5,039,032 A | 8/1991 | Rudolph |
| 5,046,688 A | 9/1991 | Woods |
| 5,050,081 A | 9/1991 | Abbott et al. |
| 5,056,741 A | 10/1991 | Bliesner et al. |
| 5,074,495 A | 12/1991 | Raymond |
| 5,082,207 A | 1/1992 | Tulinius |
| 5,082,208 A | 1/1992 | Matich |
| 5,088,665 A | 2/1992 | Vijgen |
| 5,094,411 A | 3/1992 | Rao |
| 5,094,412 A | 3/1992 | Narramore |
| 5,100,082 A | 3/1992 | Archung |
| 5,114,100 A | 5/1992 | Rudolph |
| 5,129,597 A | 7/1992 | Manthey |
| 5,158,252 A | 10/1992 | Sakurai |
| 5,167,383 A | 12/1992 | Nozaki |
| 5,203,619 A | 4/1993 | Welsch |
| 5,207,400 A | 5/1993 | Jennings |
| 5,244,269 A | 9/1993 | Harriehausen |
| 5,259,293 A | 11/1993 | Brunner |
| 5,280,863 A | 1/1994 | Schmittle |
| 5,282,591 A | 2/1994 | Walters et al. |
| 5,351,914 A | 10/1994 | Nagao |
| 5,388,788 A | 2/1995 | Rudolph |
| 5,441,218 A | 8/1995 | Mueller |
| 5,474,265 A | 12/1995 | Capbern |
| 5,493,497 A | 2/1996 | Buus |
| 5,535,852 A | 7/1996 | Bishop |
| 5,542,684 A | 8/1996 | Squirrell |
| 5,544,847 A | 8/1996 | Bliesner |
| 5,564,655 A | 10/1996 | Garland et al. |
| 5,600,220 A | 2/1997 | Thoraval |
| 5,609,020 A | 3/1997 | Jackson |
| 5,680,124 A | 10/1997 | Bedell |
| 5,681,014 A | 10/1997 | Palmer |
| 5,686,907 A | 11/1997 | Bedell |
| 5,735,485 A | 4/1998 | Ciprian et al. |
| 5,740,991 A | 4/1998 | Gleine et al. |
| 5,743,490 A | 4/1998 | Gillingham |
| 5,788,190 A | 8/1998 | Siers |
| 5,839,698 A | 11/1998 | Moppert |
| 5,875,998 A | 3/1999 | Gleine |
| 5,915,653 A | 6/1999 | Koppelman |
| 5,921,506 A | 7/1999 | Appa |
| 5,927,656 A | 7/1999 | Hinkleman |
| 5,934,615 A | 8/1999 | Treichler |
| 5,984,230 A | 11/1999 | Orazi |
| 6,015,117 A | 1/2000 | Broadbent |
| 6,033,180 A | 3/2000 | Machida |
| 6,045,204 A | 4/2000 | Frazier |
| 6,073,624 A | 6/2000 | Laurent |
| 6,076,767 A | 6/2000 | Farley et al. |
| 6,076,776 A | 6/2000 | Breitbach |
| 6,079,672 A | 6/2000 | Lam et al. |
| 6,082,679 A | 7/2000 | Crouch et al. |
| 6,109,567 A | 8/2000 | Munoz |
| 6,152,405 A | 11/2000 | Muller et al. |
| 6,161,801 A | 12/2000 | Kelm |
| 6,164,598 A | 12/2000 | Young et al. |
| 6,189,837 B1 | 2/2001 | Matthews |
| 6,213,433 B1 | 4/2001 | Gruensfelder |
| 6,227,498 B1 | 5/2001 | Arata |
| 6,244,542 B1 | 6/2001 | Young et al. |
| 6,293,497 B1 | 9/2001 | Kelley Wickemeyer et al. |
| 6,328,265 B1 | 12/2001 | Dizdarevic |
| 6,349,798 B1 | 2/2002 | McKay |
| 6,349,903 B2 | 2/2002 | Caton et al. |
| 6,364,254 B1 | 4/2002 | May |
| 6,375,126 B1 | 4/2002 | Sakurai |
| 6,382,566 B1 | 5/2002 | Ferrel et al. |
| 6,439,512 B1 | 8/2002 | Hart |
| 6,443,394 B1 | 9/2002 | Weisend |
| 6,450,457 B1 | 9/2002 | Sharp |
| 6,464,175 B2 | 10/2002 | Yada et al. |
| 6,466,141 B1 | 10/2002 | McKay et al. |
| 6,478,541 B1 | 11/2002 | Charles et al. |
| 6,481,667 B1 | 11/2002 | Ho |
| 6,484,969 B2 | 11/2002 | Sprenger |
| 6,499,577 B2 | 12/2002 | Kitamoto et al. |
| 6,536,714 B2 | 3/2003 | Gleine et al. |
| 6,547,183 B2 | 4/2003 | Farnsworth |
| 6,554,229 B1 | 4/2003 | Lam |
| 6,561,463 B1 | 5/2003 | Yount et al. |
| 6,591,169 B2 | 7/2003 | Jones |
| 6,598,829 B2 | 7/2003 | Kamstra |
| 6,598,834 B2 | 7/2003 | Nettle |
| 6,601,801 B1 | 8/2003 | Prow |
| 6,622,972 B2 | 9/2003 | Urnes, Sr. et al. |
| 6,622,974 B1 | 9/2003 | Dockter et al. |
| 6,625,982 B2 | 9/2003 | Van Den Bossche |
| 6,644,599 B2 | 11/2003 | Perez |
| 6,651,930 B1 | 11/2003 | Gautier et al. |
| 6,729,583 B2 | 5/2004 | Milliere et al. |
| 6,755,375 B2 | 6/2004 | Trikha |
| 6,796,526 B2 | 9/2004 | Boehringer |
| 6,796,534 B2 | 9/2004 | Beyer |
| 6,799,739 B1 | 10/2004 | Jones |
| 6,802,475 B2 | 10/2004 | Davies et al. |
| 6,824,099 B1 | 11/2004 | Jones |
| 6,843,452 B1 | 1/2005 | Vassberg et al. |
| 6,860,452 B2 | 3/2005 | Bacon et al. |
| 6,870,490 B2 | 3/2005 | Sherry et al. |
| 6,978,971 B1 | 12/2005 | Dun |
| 6,981,676 B2 | 1/2006 | Milliere |
| 7,007,897 B2 | 3/2006 | Wingett et al. |
| 7,028,948 B2 | 4/2006 | Pitt |
| 7,048,228 B2 | 5/2006 | Vassberg et al. |
| 7,048,234 B2 | 5/2006 | Reeksiek et al. |
| 7,048,235 B2 | 5/2006 | McLean et al. |
| 7,051,982 B1 | 5/2006 | Johnson |
| 7,059,563 B2 | 6/2006 | Huynh |
| 2002/0046087 A1 | 4/2002 | Hey |
| 2002/0184885 A1 | 12/2002 | Blot-Carretero et al. |
| 2003/0127569 A1 | 7/2003 | Bacon et al. |
| 2003/0132860 A1 | 7/2003 | Feyereisen |
| 2003/0197097 A1 | 10/2003 | Wakayama |
| 2004/0004162 A1 | 1/2004 | Beyer |
| 2004/0016556 A1 | 1/2004 | Barber |
| 2004/0059474 A1 | 3/2004 | Boorman |
| 2004/0195464 A1 | 10/2004 | Vassberg et al. |
| 2004/0217575 A1 | 11/2004 | Beaujot et al. |
| 2004/0245386 A1 | 12/2004 | Huynh |
| 2005/0011994 A1 | 1/2005 | Sakurai et al. |
| 2005/0017126 A1 | 1/2005 | McLean et al. |
| 2005/0061922 A1 | 3/2005 | Milliere |
| 2005/0109826 A1 | 5/2005 | Jones |
| 2005/0171652 A1 | 8/2005 | Speer |
| 2005/0224662 A1 | 10/2005 | Lacy |
| 2005/0242234 A1 | 11/2005 | Mahmulyin |
| 2006/0000952 A1 | 1/2006 | Rampton |
| 2006/0038086 A1 | 2/2006 | Reckzeh |
| 2006/0049308 A1 | 3/2006 | Good et al. |
| 2006/0102803 A1 | 5/2006 | Wheaton et al. |
| 2006/0226297 A1 | 10/2006 | Perez-Sanchez |
| 2006/0245882 A1 | 11/2006 | Khan et al. |

FOREIGN PATENT DOCUMENTS

| | | |
|---|---|---|
| DE | 11 29 379 | 5/1962 |
| EP | 0100775 A1 | 2/1984 |
| EP | 0 103 038 | 3/1984 |
| EP | 0 215 211 | 3/1987 |
| EP | 0 483 504 A1 | 5/1992 |
| EP | 0 781 704 | 7/1997 |
| EP | 0 947 421 | 10/1999 |
| EP | 1010616 | 6/2000 |
| EP | 1338506 | 8/2003 |

| | | |
|---|---|---|
| EP | 1 462 361 | 9/2004 |
| EP | 1 547 917 A1 | 6/2005 |
| FR | 705155 | 6/1931 |
| FR | 984 443 | 7/1951 |
| FR | 56 121 | 9/1952 |
| FR | 57-988 | 9/1953 |
| FR | 58273 | 11/1953 |
| GB | 1181991 A | 2/1970 |
| GB | 2 144 688 A | 3/1985 |

OTHER PUBLICATIONS

777 High Lift System, 777 Maintenance Manual, Publication Date: Circa 1994 (1 page).
777 Transmission—Typical, 777 Maintenance Manual, Publication Date: Circa 1994 (1 page).
A320 Hinterkantem-Klappen-Verstell System, Trailing Edge Flap System, SAE Presentation, Publication Date: Circa 1990 (1 page).
A340 Flight Controls, SAE Presentation, Publication Date: Circa 1995 (1 page).
Boeing, 777 Aircraft Maintenance Manual, Sep. 5, 2002 (p. 39).
Drela, M., "Optimization Techniques In Airfoil Design," MIT Aero & Astro, 29 pages.
Drela, Mark, "Design and Optimization Method for Multi-Element Airfoils," MIT Department of Aeronautics and Astronautics, Copyright 1993 American Institute of Aeronautics and Astronautics, Inc. (pp. 1-11).
European Search Report for European Patent Application No. EP 03 07 7840, The Boeing Company, Nov. 4, 2003 (2 pgs).
Flap Drive System, 777 Maintenance Manual, Publication Date: Circa 1994 (1 page).
Flap Transmission and Support, 777 Maintenance Manual, Publication Date: Circa 1994 (1 page).
Hansen, H., "Application of Mini-Trailing-Edge Devices in the Awiator Project," Airbus Deutschland, EGAG, Hunefeldstr. 1-5, D-28199 Bremen, Germany, 9 pages.
International Search Report, PCT/US03/19724/ Sep. 11, 2003, 5 pages.
Junkers JU 52/3M (2 pages); http://www.wpafb.af.mil/museum/outdoor/od16 [Accessed Aug. 7, 2003].
MOOG, Component Maintenance Manual, May 1994 (2 pages).
Niu, Chen-Yen, Airframe Structural Design, Chen-Yeun Niu, Conmilit Press, 1988 (1 page).
Petrov, A. V., "Certain Types of Separated Flow over Slotted Wings," Fluid Mechanics—Soviet Research, vol. 7, No. 5, Sep.-Oct. 1978, pp. 80-89.
The High Speed Frontier, Chapter 2: The High-Speed Airfoil Program, "Supercritical" Airfoils, 1957-1978 (4 pages); http://www.hq.nasa.gov/office/pao/History/SP-445/ch2-5.
TU-144 Canard, 1 pg, date unknown.
Whitcomb, Richard T., "Review of NASA Supercritical Airfoils," National Aeornautics and Space Administration, Aug. 1974 (pp. 8-18).
"Adaptive Aircraft: No Flight of Fancy? Research into using exotic means of making wings change shpe in-flight looks promising, though still a long way from reality," Business Week Online, Jan. 7, 2003, pp. 1-3.
"Aero-Space Research & Technology," Space Systems, Sep. 1, 2001, pp. 1-28.
"Flap (aircraft)", Wikipedia, The Free Encyclopedia, Aug. 3, 2006, 10:18 UTC. Wikimedia Foundation, Inc. Aug. 5, 2006; http://wn.wikipedia.org/index.pho?title=Flap_%28aircraft%29&oldid=67413665>.
"Slats.", Wikipedia, The Free Encyclopedia. Jun. 27, 2006, 12:323 UTC. Wikimedia Foundation, Inc. Aug. 5, 2006; http://wn.wikipedia.org/w/index.php?title=Slats&oldid=60827639>.
Leaf Spring Retainer Seals; EMP, Inc.; 2 pgs.
Morphing Aircraft Structures, "Morphing Aircraft Structures-Raytheon," <<http://www.defense-update.com/products/m/morphing-structures.htm>>, pp. 1-3, [Accessed Aug. 31, 2005].
Morphing Aircraft Structures, "Morphing Aircraft Structures—The Cellular Approach," >http://www.personal.psu.edu/users/d/s/dsr134/mas/Cellular.htm>, Penn State University, pp. 1-3 [Accessed Aug. 31, 2005].
Morphing Systems, "Morphing Aerostructures—An Overview," www.crgrp.net/morphingsystems.htm <http://www.crgrp.net/morphingsystems.htm>, pp. 3-9, [Accessed Aug. 31, 2005].

* cited by examiner

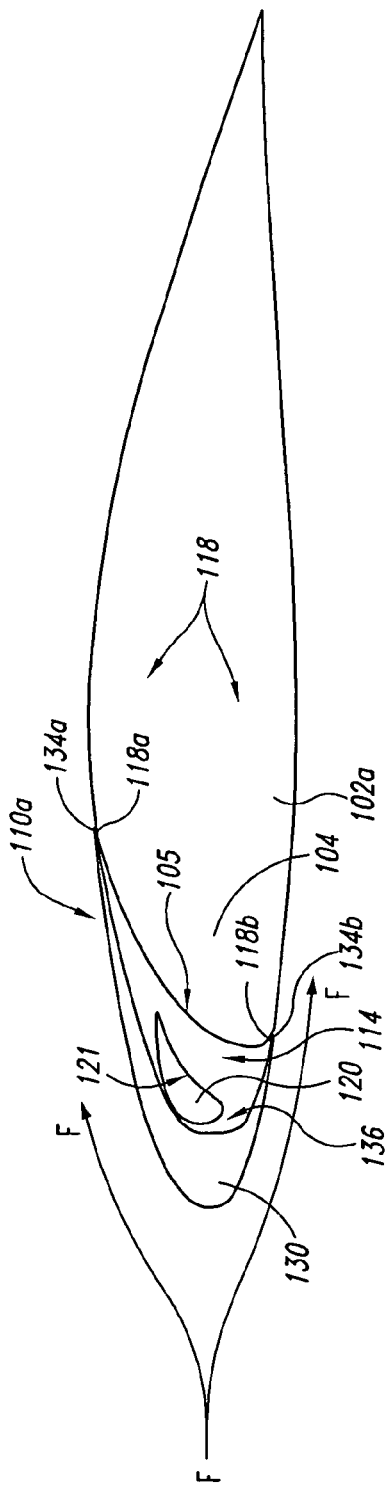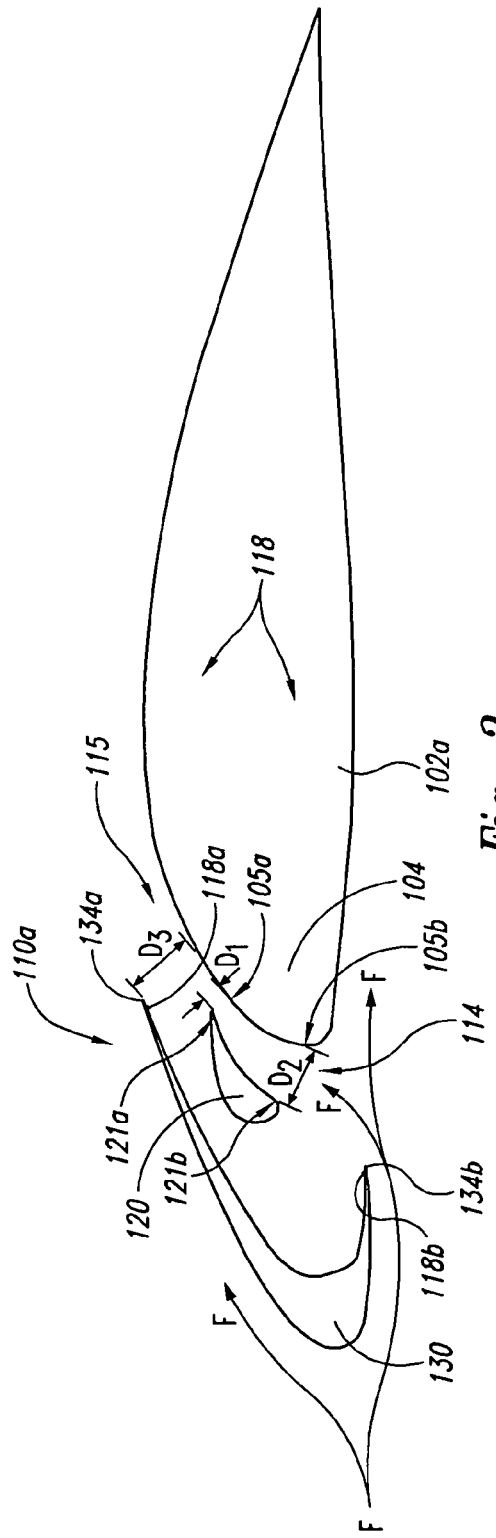

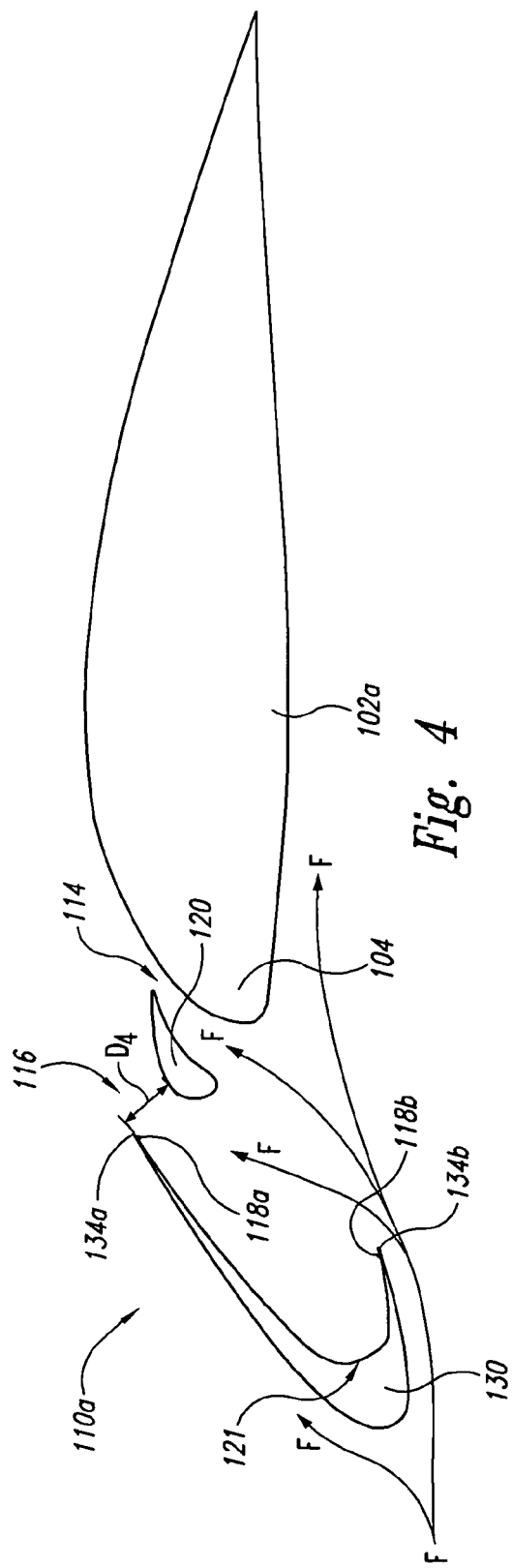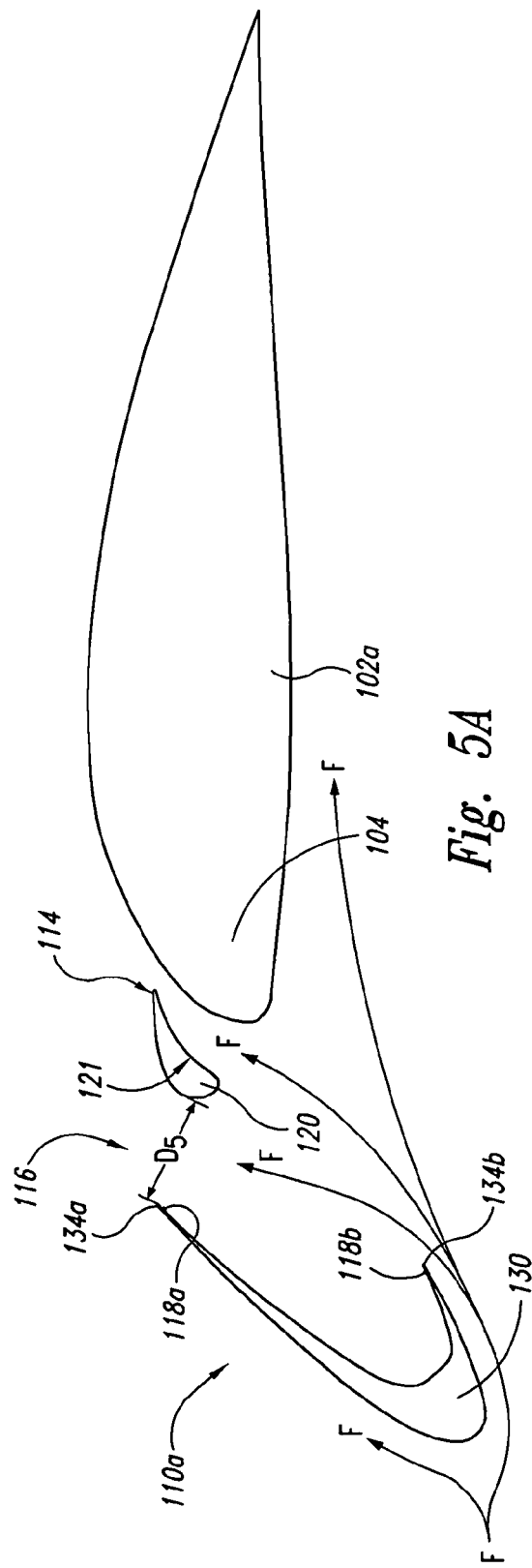

AEROSPACE VEHICLE LEADING EDGE SLAT DEVICES AND CORRESPONDING METHODS

TECHNICAL FIELD

Embodiments of the present invention relate to aerospace vehicle leading edge slat devices and corresponding methods, for example, an aerospace vehicle having a leading edge slat with one movable surface or body capable of having a first position with a single slot and a second position with a double slot.

BACKGROUND

Modern aircraft often use a variety of high lift leading and trailing edge devices to improve high angle of attack performance during various phases of flight, for example, takeoff and landing. One such device is a leading edge slat. Current leading edge slats generally have a stowed position in which the slat forms a portion of a leading edge of a wing, and one or more deployed positions in which the slat extends forward and down to increase the camber and/or plan form area of the wing. The stowed position is generally associated with low drag at low angles of attack and can be suitable for cruise and other low angle of attack operations. The extended position(s) is/are generally associated with improved air flow characteristics over the aircraft's wing at higher angles of attack.

In some cases, a slot is created between the slat and the wing as the slat extends. During certain operating conditions, air can flow through this slot to energize the air flow over the upper surface of the wing, improving air flow characteristics over selected regions of the wing. A drawback of current systems is that it can be difficult to properly form and/or properly place the slot to achieve the desired flow characteristics proximate to the leading edge device and the airfoil, even when using complex devices and/or arrangements (e.g., complex linkage and actuator combinations).

SUMMARY

The present invention is directed generally toward aerospace vehicle leading edge slat devices and corresponding methods. One aspect of the invention is directed toward an aerospace vehicle system that includes an airfoil having a leading edge. The system further includes a first flow body and a second flow body. The first flow body can be fixedly coupled to the airfoil to form at least one gap between the leading edge of the airfoil and the first flow body. The second flow body can be movably coupled to the airfoil and can be movable between a retracted position and an extended position. In the retracted position, the second flow body can be positioned to at least approximately aerodynamically seal the at least one gap. In the extended position, the second flow body can be positioned to allow fluid flow through the at least one gap. In a further aspect of the invention, the system can include an aerospace vehicle and the airfoil can be coupled to the aerospace vehicle. In a still further aspect of the invention, the at least one gap can include at least one first gap and the extended position of the second flow body can include a first extended position. The second flow body can also be movable to a second extended position where the second flow body can be positioned to allow fluid flow through the at least one first gap and to form at least one second gap between the second flow body and the first flow body.

Another aspect of the invention is directed toward a method for making an aerospace vehicle system that includes fixedly coupling a first flow body to an airfoil to form at least one gap between the first flow body and a leading edge of the airfoil. The method can further include coupling a second flow body to the airfoil to be movable between a retracted and an extended position. In the retracted position, the second flow body can at least approximately aerodynamically seal the at least one gap. In the extended position, the second flow body can be positioned to allow fluid flow through the at least one gap. In a further aspect of the invention, coupling a second flow body to the airfoil to be movable between a retracted and an extended position can include coupling a second flow body to an airfoil to be movable between a retracted and a first extended position. In the first extended position, the second flow body can be positioned to allow fluid flow through at least one first gap. The second flow body can be movable to a second extended position where the second flow body can be positioned to allow fluid flow through the at least one first gap and to form at least one second gap between the second flow body and the first flow body.

BRIEF DESCRIPTION OF THE DRAWINGS

FIG. 2 is a partially schematic cross-sectional view of the first airfoil shown in FIG. 1 with the first leading edge device in a retracted position.

FIG. 3 is a partially schematic cross-sectional view of the first airfoil shown in FIG. 2 with the first leading edge device in a first extended position.

FIG. 4 is a partially schematic cross-sectional view of the first airfoil shown in FIG. 2 with the leading edge device in a second extended position.

FIG. 5A is a partially schematic cross-sectional view of the first airfoil shown in FIG. 2 with the first leading edge device in a third extended position.

DETAILED DESCRIPTION

The present disclosure describes leading edge slat devices and corresponding methods. Several specific details of the invention are set forth in the following description and in FIGS. 1–8B to provide a thorough understanding of certain embodiments of the invention. One skilled in the art, however, will understand that the present invention may have additional embodiments, and that other embodiments of the invention may be practiced without several of the specific features described below.

Figure 1:
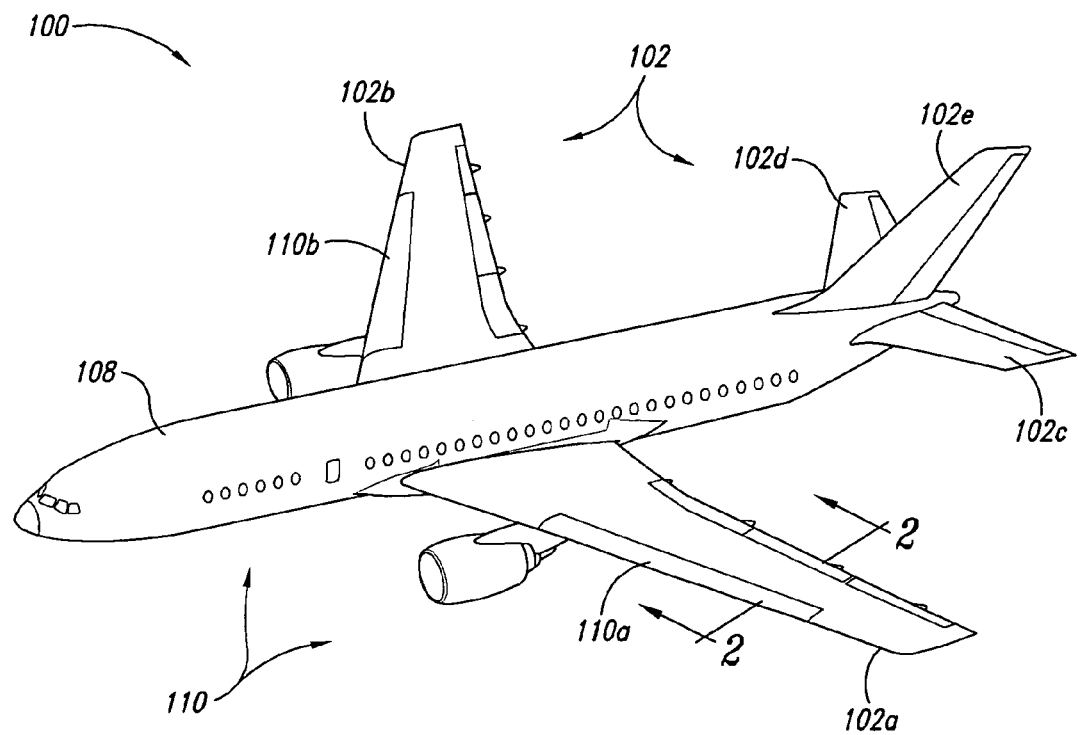
FIG. 1 is a partially schematic illustration of an aerospace vehicle system having a first airfoil with a first leading edge device and a second airfoil with a second leading edge device in accordance with embodiments of the invention.

FIG. 1 is a partially schematic illustration of an aerospace vehicle system 100 that includes an aerospace vehicle 108, at least one airfoil 102, and at least one leading edge device 110 or leading edge means. In FIG. 1, the aerospace vehicle 108 includes an aircraft. In other embodiments, the aerospace vehicle can include other types of aerospace vehicles, for example, a space plane.

In the illustrated embodiment, five airfoils 110 are shown as a first airfoil 102a, a second airfoil 102b, a third airfoil 102c, a fourth airfoil 102d, and a fifth airfoil 102e, each coupled to the aerospace vehicle 108. A first leading edge device 110a is coupled to the first airfoil 102a (e.g., a first wing). A second leading edge device 110b is coupled to a second airfoil 102b (e.g., a second wing).

Other embodiments can have more or fewer airfoils 102, more or fewer leading edge devices 110, and/or different arrangements of leading edge devices 110 and airfoils 102. For example, in certain embodiments the first and second airfoils 102a, 102b can each have multiple leading edge devices 110 or no leading edge devices 110. In other embodiments, the leading edge devices 110 can be coupled to other airfoils (e.g., the third and fourth airfoils 102c, 102d). In certain embodiments, the leading edge devices 110 can be configured to have at least two flow bodies (e.g., bodies, surfaces, objects, or structures, a portion of which is configured to interact with a fluid flow when exposed to a fluid flow). The at least two flow bodies can be configured to have at least one gap that provides a desired flow characteristic proximate to the leading edge devices 110 and the airfoils 102 when the leading edge devices 110 are in one or more selected stationary positions.

FIG. 2 is a partially schematic cross-sectional view of the first airfoil 102a and the first leading edge device 110a taken along line 2—2 in FIG. 1. In the illustrated embodiment, the first leading edge device 110a includes a first flow body 120 and a second flow body 130. The first flow body 120 can be fixedly coupled to the first airfoil 102a to form at least one first gap 114 between at least one portion 121 of the first flow body 120 and at least one portion 105 of a leading edge 104 of the first airfoil 102a. Only one first gap 114 is shown in FIG. 2. In other embodiments, the first leading edge device 110a can include additional first gaps and/or additional gaps between different combinations of components. For example, in another embodiment, the first leading edge device 110a can have three flow bodies, including two flow bodies fixedly attached to the leading edge 104 of the first airfoil 102a which form two gaps, as discussed below with reference to FIG. 7A.

The second flow body 130 can be movably coupled to the first airfoil 102a and can have a stationary retracted position and one or more stationary extended positions. In the retracted position (shown in FIG. 2), the second flow body 130 can be positioned to at least approximately aerodynamically seal the first gap 114. For example, in the retracted position, one or more portion(s) of the second flow body 130 can be located proximate to (e.g., touching or near) the first airfoil 102a to generally prevent a significant amount of fluid flow F, created by the motion of the vehicle through the air or fluid mass, from passing through the first gap 114. Accordingly, the fluid flow F created by the motion of the aerospace vehicle through the air mass generally flows around (e.g., above and below) the first leading edge device 110a. In the illustrated embodiment, the second flow body 130 includes an upper trailing edge 134a, a lower trailing edge 134b, and a recess 136. When the first leading edge device 110a is in the retracted position, the second flow body 130 can be positioned so that the first flow body 120 is located in the recess 136, and the upper trailing edge 134a and the lower trailing edge 134b can be located proximate to the first airfoil 102a to aid in preventing fluid flow F through the first gap 114 (e.g., to form an aerodynamic seal between the second flow body 130 and the first leading edge 102a).

Sealing devices 118 can be used to aid the second flow body 130 in aerodynamically sealing the first gap 114. For example, a first sealing device 118a can be located between the upper trailing edge 134a of the second flow body 130 to aid in aerodynamically sealing the first gap 114 when the second flow body 130 is in the retracted position. In the illustrated embodiment, the sealing device 118a includes a bulb seal attached to the upper trailing edge 134a of the second flow body 130 that is positioned to contact the leading edge 104 of the first airfoil 102a when the second flow body 130 is placed in the retracted position. Similarly, a second sealing device 118b can be located between the lower trailing edge 134b of the second flow body 130 and the first airfoil 102a to further aid in aerodynamically sealing the first gap 114.

In other embodiments, the first leading edge device 110a can include other sealing device arrangements or no sealing devices 118. For example, in certain embodiments the second flow body 130 can have more or fewer trailing edges and/or the more or fewer sealing devices 118 can be used. Additionally, the sealing devices 118 can be placed on other portions of the second flow body 130 (e.g., forward of the trailing edge(s) of the second flow body 130) and/or on the leading edge 104 of the first airfoil 102a. Additionally, in certain embodiments the sealing device(s) 118 can include sealing device(s) different than the bulb seals shown in FIG. 2 (e.g., a flexible lip).

FIG. 3 is a partially schematic illustration of the first airfoil 102a, shown in FIG. 2 with the first leading edge device 110a in a first extended position. In the first extended position, the second flow body 130 is positioned to allow a portion of the fluid flow F proximate to the first leading edge device 110a and the first airfoil 102a to flow through the first gap 114. For example, the second flow body 130 can move forward and/or down to uncover at least a potion of the first gap 114.

In certain embodiments, the first gap 114 can be configured to provide certain flow characteristics and can have multiple portions. In the illustrated embodiment, the first gap 114 includes two portions. The first portion of the first gap 114 has a first distance $D_1$ between a first portion 121a of the first flow body 120 and a first portion 105a of the leading edge 104 of the first airfoil 102a. The second portion of the first gap 114 has a second distance $D_2$ between a second portion 121b of the first flow body 120 and a second portion 105b of the leading edge 104 of the first airfoil 102a. The first distance $D_1$ can be different (e.g., smaller) than the second distance $D_2$, creating a tapered gap or a tapering effect. This tapered effect can influence the fluid flow F through the first gap 114 (e.g., by creating a venturi effect).

Other embodiments can have other arrangements. For example, in certain embodiments, the first gap 114 can include a taper in the opposite direction (e.g., where the second distance $D_2$ is smaller than the first distance $D_1$). In other embodiments, the first gap 114 can include multiple tapered sections and/or other shapes. In still other embodiments, the first gap 114 can be untapered.

In FIG. 3, the second flow body 130 is positioned to form a passageway 115, having a third distance $D_3$, between the upper trailing edge 134a of the second flow body 130 and the leading edge 104 of the first airfoil 102. Fluid flow F passing through the first gap 114 also passes through the passageway 115. Accordingly, in certain cases, the fluid flow F through and proximate to the first gap 114 can be affected. For example, if the third distance $D_3$ is small, flow through the first gap 114 can be restricted and/or the direction of the fluid flow F exiting the first gap 114 can be affected (e.g., changed). If the third distance $D_3$ is large (larger than shown in FIG. 3), the flow through the first gap 114 may be generally unrestricted and the direction of the flow can be influenced by only a small amount. In other embodiments, a passageway controlling airflow through the gap can be formed by the lower trailing edge 134b of the second flow body 130 and the leading edge 104 of the first airfoil 102a in addition to or in lieu of the passageway 115 shown in FIG. 3.

FIG. 4 is a partially schematic illustration of the first airfoil 102a, shown in FIG. 2 with the first leading edge device 110a in a second extended position, in accordance with a further embodiment of the invention. In the second extended position, the second flow body 130 can be positioned to allow fluid flow F through the first gap 114 and to form a second gap 116 with a fourth distance $D_4$ between the first flow body 120 and the second flow body 130. Accordingly, a portion of the fluid flow F can flow through the first and second gaps 114, 116.

The size of the second gap 116 can affect the amount of fluid flow F that passes through the second gap 116, and thereby affect the fluid flow F proximate to the first leading edge device 110a and the first airfoil 102a. For example, FIG. 5A shows the first airfoil 102a with the first leading edge device 110a in a third extended position. In the third extended position, the second flow body 130 can be positioned to allow fluid flow F through the first gap 114 and to form the second gap 116 between the second flow body 130 and the first flow body 120 with a fifth distance $D_5$. The fifth distance $D_5$ can be different (e.g., larger) than the fourth distance $D_4$, shown in FIG. 4. Accordingly, when the first leading edge device 110a is in the third extended position, it can create different flow characteristics proximate to the first leading edge device 11a and/or the first airfoil 102a than when it is in the second extended position. For example, during certain operating conditions, more fluid flow F can pass through the second gap 116 when the second flow body 130 is in the third extended position than when the second flow body 130 is in the second extended position.

Figure 5B:
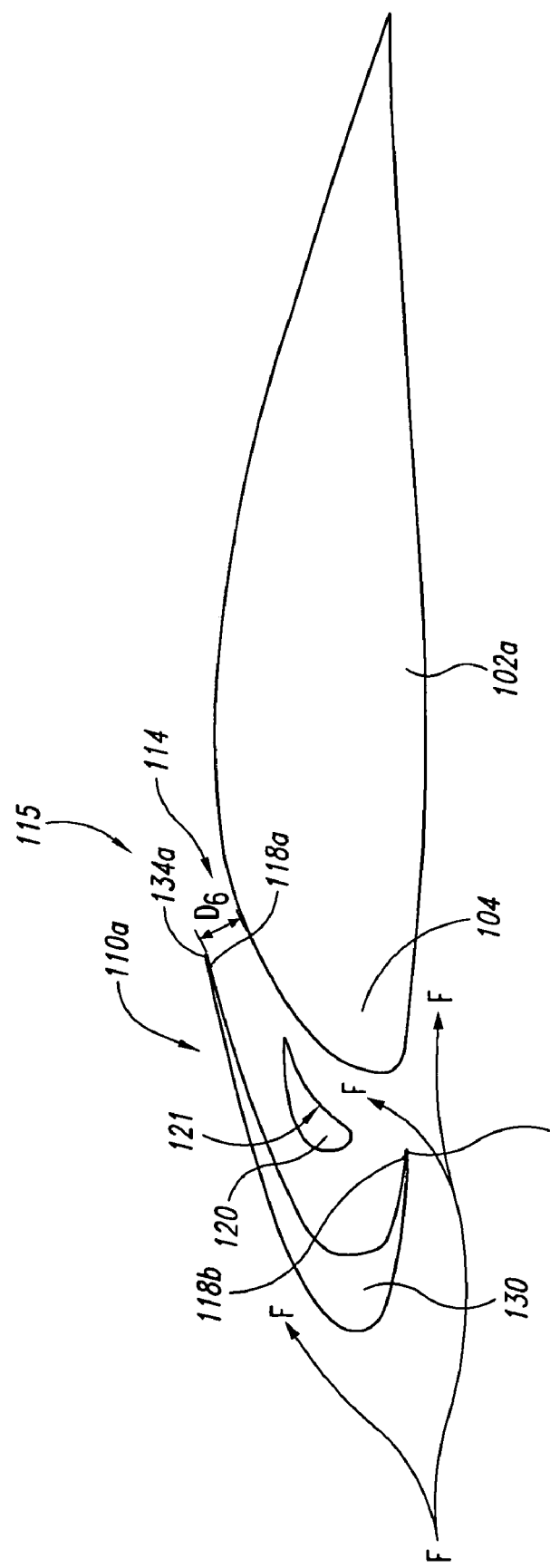
FIG. 5B is a partially schematic cross-sectional view of the first airfoil shown in FIG. 2 with the first leading edge device in a fourth extended position.

In certain embodiments, the second flow body 130 can also have one or more additional positions that affect the fluid flow F through the first gap 114. For example, FIG. 5B shows the first airfoil 102a with the first leading edge device 110a in a fourth extended position where the second flow body 130 is positioned to create the passageway 115 with a sixth distance $D_6$ between the second flow body 130 and the first airfoil 102a. The sixth distance $D_6$ is different (e.g., smaller) than the third distance $D_3$, shown in FIG. 3. Accordingly, when the first leading edge device 110a is in the fourth extended position, it can create different flow characteristics proximate to the first leading edge device 110a and/or the first airfoil 102a than when it is in the first extended position. For example, during certain operating conditions, fluid flow F through the first gap 114 can be more restricted when the first leading edge device 110a is in the fourth extended position (shown in FIG. 5B) than when the first leading edge device 110a is in the first extended position (shown in FIG. 3).

As discussed above with reference to FIG. 3, in other embodiments, other portions of the second flow body 130 and/or the first airfoil 102a can be used to create passageways proximate to the first gap 114. For example, in certain embodiments, the second flow body 130 can be positioned to create a passageway between a lower portion of the second flow body 130 (e.g., the lower trailing edge 134b of the second flow body 130) and the first airfoil 102a. In certain embodiments, the second flow body 130 can form multiple passageways between the second flow body 130 and the first airfoil 102a (e.g., above and below the first gap 114).

Figure 6:
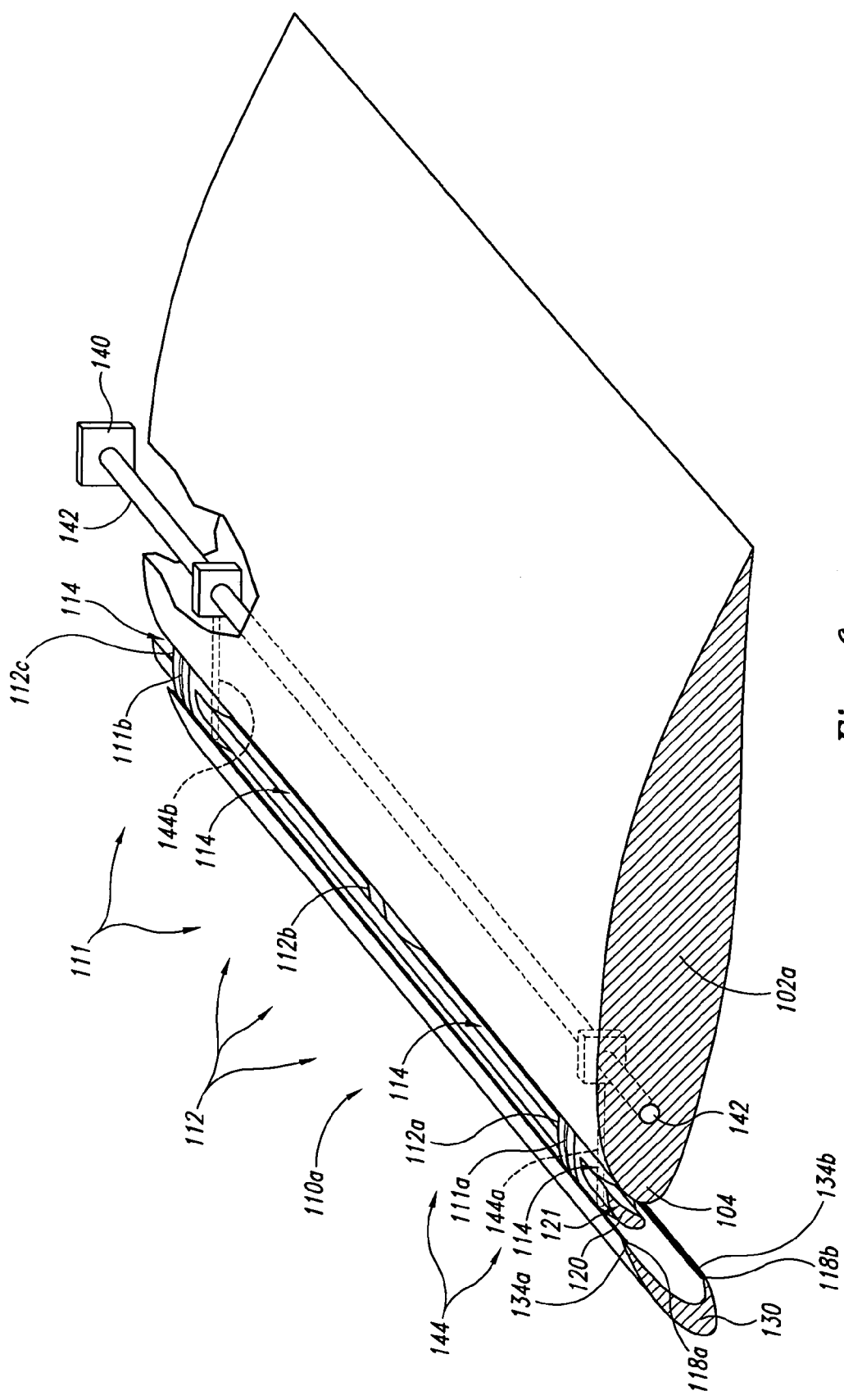
FIG. 6 is a partially schematic isometric view of the first airfoil shown in FIGS. 1 and 2 with the first leading edge device in the second extended position.

FIG. 6 is a partially schematic isometric view of a portion of the first airfoil 102a shown in FIG. 1 with the first leading edge device 110a in the second extended position. The first leading edge device 110a can be coupled to the leading edge 104 of the first airfoil 102a via supports 112 (shown as first, second, and third supports 112a–112c, respectively) and tracks 111 (shown schematically in FIG. 6). In the illustrated embodiment, the supports 112 divide multiple first gaps 114, which are laterally disposed along the span of the leading edge 104 of the first airfoil 102a. The supports 112 can fixedly couple the first flow body 120 to the first airfoil 102a. The supports 112 can also carry the tracks 111 that support the second flow body 130 and allow the second flow body 130 to move (e.g., move between the retracted and at least one extended position). Additionally, the supports 112 can carry linkage(s) 144 (shown schematically in FIG. 6) used to move the second flow body 130. In the illustrated embodiment, the first support 112a carries a first track 111a and first linkage 144a. Similarly, the third support 112c carries a second track 111b and a second linkage 144b.

An actuation device 140 or actuation means can be used to provide the force to move the second flow body 130. In the illustrated embodiment, the actuation device 140 is coupled to a torque tube 142 which is coupled to the linkages 144. In other embodiments, the first leading edge device 110a and the first airfoil 102a can have other arrangements. For example, in certain embodiments, multiple actuation devices 140 can be coupled to the first leading edge device 110a and/or to the second flow body 130 with different and/or fewer tracks 111 and linkages 144. In certain embodiments, the first flow body 120 is not fixedly coupled to the first airfoil 102a. Instead, the first flow body 120 is coupled to the first airfoil 102a and at least one actuation device, and is configured to be movable (e.g., movable relative to the first airfoil 102a and/or the second flow body 130). In various embodiments, the actuation device(s) 140 can include pneumatic, hydraulic, electric, and/or mechanical actuator(s).

Figure 7A:
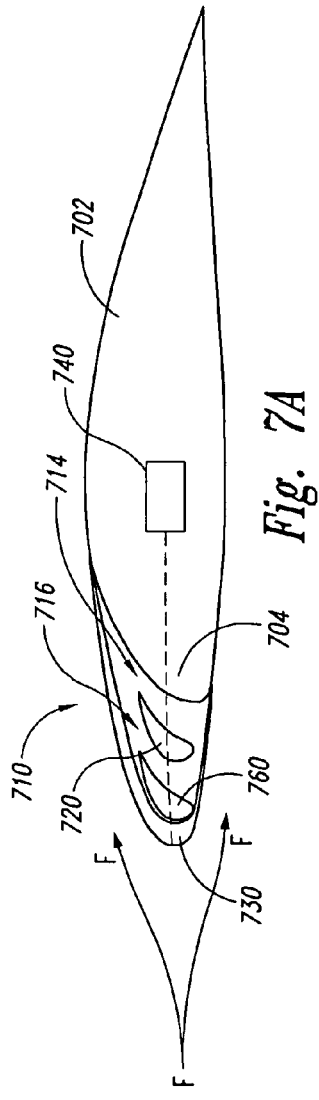
FIG. 7A is a partially schematic cross-sectional view of an airfoil and a leading edge device in a retracted position in accordance with another embodiment of the invention.

In other embodiments, the leading edge device can include more than two flow bodies. For example, FIG. 7A is a partially schematic cross-sectional view of an airfoil 702 and a leading edge device 710 (or leading edge means) having a first flow body 720, a second flow body 730, and a third flow body 760 in accordance with another embodiment of the invention. The first flow body 720 can be fixedly coupled to the airfoil 702 so that there is a first gap 714 between a portion of the first flow body 720 and a leading edge 704 of the airfoil 702. The third flow body 760 can also be fixedly coupled to the airfoil 702 so that there is a second gap 716 between a portion of the first flow body 720 and a portion of the third flow body 760. For example, the third flow body 760 can be fixedly coupled to the airfoil 702 so that the third flow body 760 is positioned between the first flow body 720 and the second flow body 730. In the retracted position (shown in FIG. 7A) the second flow body 730 is positioned to at least approximately aerodynamically seal the first and second gaps 714, 716.

Figure 7B:
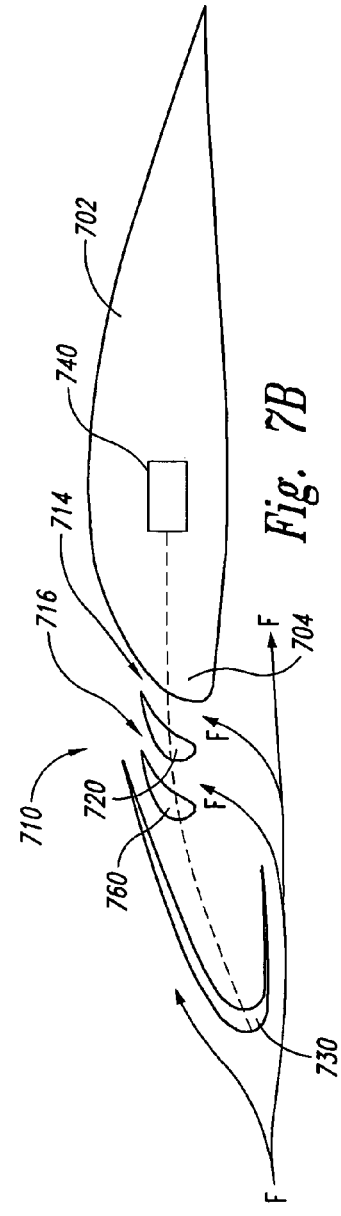
FIG. 7B is a partially schematic cross-sectional view of the airfoil and leading edge device shown in FIG. 7A with a leading edge device in a first extended position.
Figure 7C:
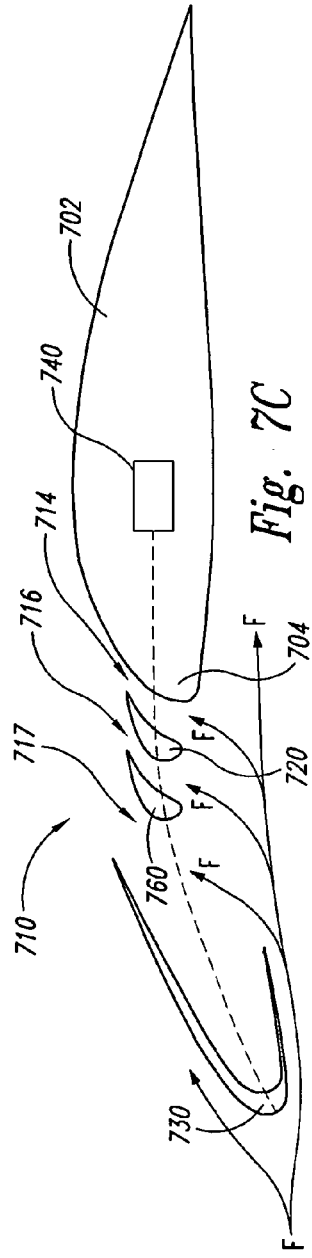
FIG. 7C is a partially schematic cross-sectional view of the airfoil and leading edge device shown in FIG. 7A with a leading edge device in a second extended position.

FIG. 7B is a partially schematic illustration of the airfoil 702, shown in FIG. 7A, with the leading edge device 710 in a first extended position. In the first extended position, the second flow body 730 can be located to allow fluid flow F through the first and second gaps 714, 716, and thereby can affect fluid flow F proximate to the leading edge device 710 and/or the airfoil 702. In a further embodiment, the leading edge device 710 can move to a second extended position, shown in FIG. 7C, where the second flow body 730 can be positioned to allow fluid flow F through the first and second gaps 714, 716 and to form a third gap 717 between the second flow body 730 and the third flow body 760. In some cases, fluid flow F through the third gap 717 can affect the fluid flow proximate to the leading edge device 710 and/or the airfoil 702.

Figure 7D:
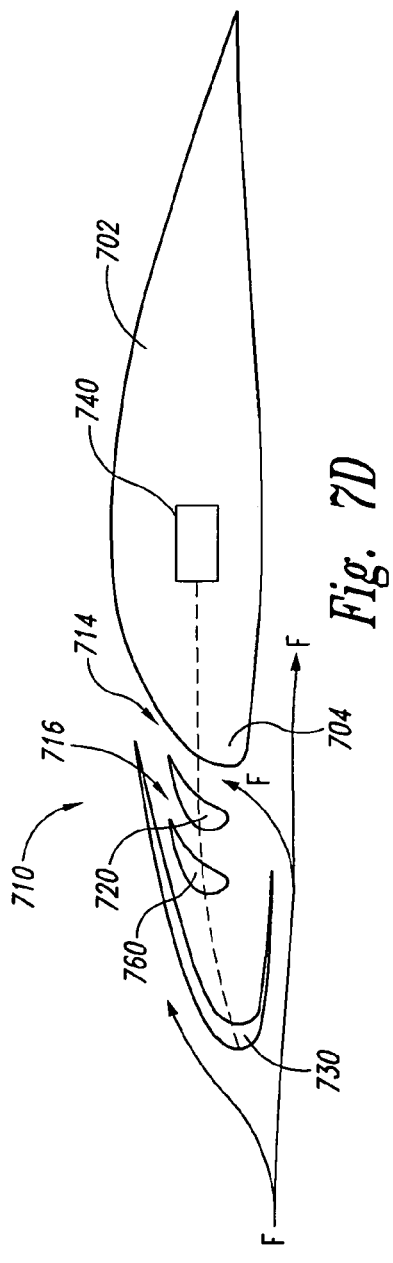
FIG. 7D is a partially schematic cross-sectional view of the airfoil and leading edge device shown in FIG. 7A with a leading edge device in a third extended position.

In other embodiments, the leading edge device 710 can have other extended positions that can affect fluid flow F proximate to the leading edge device 710 and the airfoil 702. For example, as shown in FIG. 7D, the leading edge device 710 can move to a third extended position where the second flow body 730 allows fluid flow F through the first gap 714, but not through the second gap 716. In still other embodiments, the leading edge device 710 can include one or more extended positions where the second flow body 730 is positioned to form at least one passageway between the second flow body 730 and the airfoil 702 to affect the fluid flow F through the first and/or second gaps 714, 716 (similar to passageways discussed above with reference to FIGS. 3 and 5B). In yet another embodiment, similar to an embodiment discussed above with reference to FIG. 5A, the second flow body 730 can be positioned to allow fluid flow F through the first and second gaps 714, 716 and to form a third gap 717 between the second flow body 730 and the airfoil 702 that is larger than the third gap 717 shown in FIG. 7C.

In still other embodiments, the first and/or third flow bodies 720, 760 are not fixedly coupled to the airfoil 702. Instead, the first and/or third flow bodies 720, 760 can be coupled to the airfoil 702 and at least one actuation device 740 (shown schematically). The first and/or second flow bodies 720, 760 can be configured to be movable relative to the airfoil 702, the second flow body 730, and/or each other. Accordingly, the first and/or third flow bodies 720, 760 can be positioned to interact with the fluid flow F (e.g., affect fluid flow F through the first, second, and/or third gaps 714, 716, 717). Additionally, in certain embodiments, the first and/or third flow bodies can be positioned to facilitate being fully enclosed by the second flow body 730 and the leading edge of the airfoil 702 across a spanwise portion of the airfoil 702. For example, in the retracted position, the second flow body 730 can be at least approximately aerodynamically sealed with the airfoil 702 above and below the first and third flow bodies 720, 760 across a spanwise section of the airfoil (e.g., the two trailing edges of the second flow body 730 can be approximately aerodynamically sealed with the leading edge of the airfoil 702 across the spanwise section as shown in FIG. 7A).

Figure 8A:
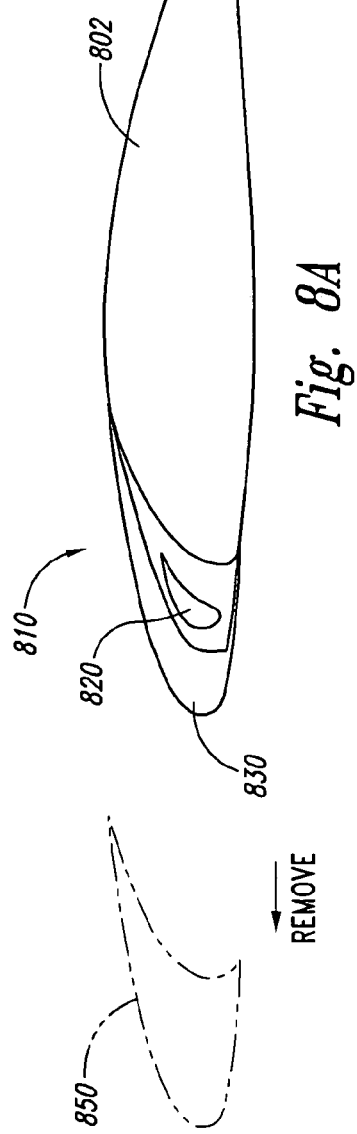
FIG. 8A is a partially schematic cross-sectional view of an airfoil where a portion of a leading edge device has been removed, and a first flow body and a second flow body have been coupled to the leading edge of the airfoil in accordance with embodiments of the invention.

It can be desirable to install leading edge devices in accordance with embodiments described above on existing aerospace vehicles having existing or first leading edge devices. For example, as shown in FIG. 8A, a portion of a first leading edge device 850 can be removed from an airfoil 802 that is coupled to an aerospace vehicle. A first flow body 820 and a second flow body 830 can be coupled to the airfoil 802 to form a second leading edge device 810 configured to operate in accordance with various embodiments discussed above. In certain embodiments, the second flow body 830 can be coupled to one or more existing actuation devices. In other embodiments, one or more separate and/or different actuation devices can be coupled between the airfoil 802 and the second leading edge device 810. In certain embodiments, when the second flow body 830 is placed in a retracted position, the combination of the airfoil 802 and the second leading edge device 810 can have the same profile as the combination of the airfoil 802 and first leading edge device did before the portion of the first leading edge device 850 was removed.

Figure 8B:
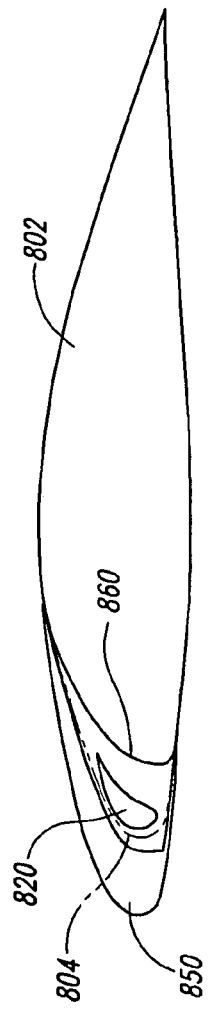
FIG. 8B is a partially schematic cross-sectional view of an airfoil where a first portion of the leading edge of the airfoil has been removed, and a second portion of the leading edge of the airfoil and a first flow body have been coupled to the airfoil in accordance with embodiments of the invention.

In other embodiments, the existing aerospace vehicle can have a leading edge device and an airfoil 802 with a first leading edge portion 804 (shown by ghosted lines). The existing or first leading edge device can include a portion of the first leading edge device 850 that is movable between at least two positions (e.g., a retracted and an extended position). The first leading edge portion 804 can be removed from the airfoil 802. A second leading edge portion 860 and a first flow body 820 can be coupled to the airfoil 802, and configured to operate with the portion of the first leading edge device 850 in accordance with various embodiments discussed above (e.g., where the portion of the first leading edge device 850 becomes or operates as a second flow body). In other embodiments, the portion of the first leading edge device 850 can also be removed and replaced by a different flow body (e.g., a new second flow body). In certain embodiments (e.g., as shown in FIG. 8B), the outline of the side profile of the airfoil 802, the second leading edge portion 860, and the first flow body 820 can be similar in area to that of the outline of the side profile of the airfoil 802 and the first leading edge portion 804.

A feature of various embodiments discussed above is that a leading edge device having at least one fixed flow body and a movable flow body can be used to tailor the air flow characteristics proximate to the leading edge device and the airfoil. The leading edge device can have a retracted position and any combination of extended positions, including any single extended position or combination of the extended positions discussed above with reference to FIGS. 1–7D. In the retracted and/or extended position(s), at least one of the flow bodies can be positioned forward of and/or below the airfoil to form an extension of a leading edge of the airfoil. Accordingly, the leading edge device can be positioned to create various cambers and/or plan forms of the aerospace vehicle system (e.g., a leading edge device and airfoil combination) to affect the air flow characteristics proximate to the aerospace vehicle system.

Additionally, the leading edge devices can be movable to selected positions where at least one gap can provide additional air flow tailoring during selected operating conditions. For example, a gap can provide high energy air from the lower surface of the airfoil and leading edge device to a portion of the upper surface of the airfoil and/or leading edge device to delay boundary layer separation and/or to provide other fluid flow characteristics. In certain situations, this feature can increase the maximum lift coefficient and/or increase the stall angle of attack over that provided by current systems. Additionally, this feature can be used to improve other performance characteristics (e.g., to improve and/or control a lift over drag ratio, to control spanwise lift distribution, and/or to improve stall characteristics) over those obtained by current systems.

Accordingly, leading edge devices in accordance with some or all of the embodiments described above can be used to configure aerospace vehicles for various phases of flight by moving the leading edge devices to selected positions. For example, a retracted position (including the retracted position shown in FIG. 2) can be used during a cruise phase of flight. A first extended position (including the position shown in FIG. 3) can be used to provide a lift-to-drag coefficient that is desirable for takeoff by allowing fluid flow through a single gap. A second extended position with two gaps (including the second extended position shown in FIG. 4) can be used during landing where a higher stall angle of attack and/or lift coefficient is desirable to reduce the vehicle's approach speed and where higher drag values can be acceptable or desired.

An advantage of this feature is that aircraft performance can be improved over that available with current systems. For example, improvements in the lift to drag coefficient during takeoff performance can allow more weight to be carried off a given runway and lower approach speeds can allow more weight to be carried into a given runway. Additionally, improvement in other flight characteristics can increase safety (e.g., by improving stall characteristics) and/or reduce structural requirements (e.g., by controlling spanwise lift distribution). Additionally, in embodiments where flow bodies are movable (e.g., the first and second flow bodies are both movable), aircraft performance can be further tailored by affecting the fluid flow through the gaps created by the flow bodies and/or by providing a retracted position that is compact and better optimized for cruise operations.

Another feature of some of the embodiments discussed above is that aerodynamic characteristics can be tailored by locating one or more slots or gaps at or near desired locations without the complexity and/or large number of moving parts of current systems. This can reduce the total number of parts required to build the leading edge device over that required with current systems. An advantage of this feature is that manufacturing costs can be reduced. Another advantage of this feature is that weight of the vehicle can be reduced, resulting in a reduction in operating costs. Still another advantage of this feature is that it can have fewer parts that wear out, thereby reducing maintenance costs.

From the foregoing, it will be appreciated that specific embodiments of the invention have been described herein for purposes of illustration, but that various modifications may be made without deviating from the spirit and scope of the invention. Accordingly, aspects of the invention described in the context of particular embodiments may be combined or eliminated in other embodiments. For example, other methods can be used and/or combined with features described above to affect flow through selected gaps and/or proximate to the aerospace vehicle system (e.g., blown air or suction proximate to a selected gap can be used to affect flow through the gap). Although advantages associated with certain embodiments of the invention have been described in the context of those embodiments, other embodiments may also exhibit such advantages. Additionally, none of the foregoing embodiments need necessarily exhibit such advantages to fall within the scope of the invention. Accordingly, the invention is not limited except as by the appended claims.

I claim:

1. An aerospace vehicle system, comprising:
an airfoil having a leading edge;
a first flow body fixedly coupled to the airfoil to form at least one gap between the leading edge of the airfoil and the first flow body; and
a second flow body having a recess, an upper trailing edge, and a lower trailing edge, the second flow body being movably coupled to the airfoil to move between:
a retracted position wherein the second flow body is positioned to at least approximately aerodynamically seal the at least one gap, and wherein the first flow body is located in the recess, the upper trailing edge is positioned proximate to the leading edge of the airfoil to at least approximately aerodynamically seal with the airfoil, and the lower trailing edge is positioned proximate to the leading edge of the airfoil to at least approximately aerodynamically seal with the airfoil; and
an extended position where the second flow body is positioned to allow fluid flow through the at least one gap.

2. The system of claim 1, further comprising an actuation device coupled to the second flow body to move the second flow body, the actuation device including at least one of a hydraulic actuator, a mechanical actuator, a pneumatic actuator, and an electric actuator.

3. The system of claim 1 wherein the at least one gap includes a tapered gap.

4. The system of claim 1 wherein the at least one gap includes at least one first gap and the extended position of the second flow body includes a first extended position, and wherein the second flow body is movable to a second extended position where the second flow body is positioned to allow fluid flow through the at least one first gap and to form at least one second gap between the second flow body and the first flow body.

5. The system of claim 1 wherein the at least one gap includes at least one first gap and the extended position of the second flow body includes a first extended position, and wherein the second flow body is movable between:
a second extended position where the second flow body is positioned to allow fluid flow through the at least one first gap and to allow fluid flow through at least one second gap between the second flow body and the first flow body, the at least one second gap having a first distance between the second flow body and the first flow body; and
a third extended position where the second flow body is positioned to allow fluid flow through the at least one first gap and the at least one second gap, the at least one second gap having a second distance between the second flow body and the first flow body, the second distance being different than the first distance.

6. An aerospace vehicle system, comprising:
an airfoil having a leading edge;
a first flow body fixedly coupled to the airfoil to form a first gap between the leading edge of the airfoil and the first flow body;
a second flow body movably coupled to the airfoil; and
a third flow body fixedly coupled to the leading edge of the airfoil, the third flow body positioned to form a second gap between the first flow body and the third flow body, wherein the second flow body is movable between:
- a retracted position where the second flow body is positioned to at least approximately aerodynamically seal the first gap and the second gap; and
- an extended position where the second flow body is positioned to allow fluid flow through at least one of the first gap and the second gap.

7. The system of claim 6 wherein the extended position includes a first extended position, and wherein the second flow body is movable among:
- the retracted position;
- the first extended position; and
- a second extended position where the second flow body is positioned to allow fluid flow through the first gap and the second gap, and to form at least one third gap between the second flow body and the third flow body.

8. The system of claim 1, further comprising at least one sealing device positioned between the second flow body and the airfoil to aid in preventing fluid flow through the at least one gap when the second flow body is in the retracted position.

9. The system of claim 1 wherein the second flow body is positioned forward of, below, or both forward of and below the airfoil to form an extension of the leading edge of the airfoil when the second flow body is in the extended position.

10. The system of claim 1 wherein:
- the extended position includes a first extended position where the second flow body is positioned to form a passageway with a first distance between the second flow body and the leading edge of the airfoil, the passageway being positioned to affect the air flow through the at least one gap; and
- the second flow body is movable to a second extended position where the passageway has a second distance between the second flow body and the leading edge of the airfoil, the second distance being different than the first distance.

11. A method for making an aerospace vehicle system, comprising:
- fixedly coupling a first flow body to an airfoil to form at least one gap between the first flow body and a leading edge of the airfoil; and
- movably coupling a second flow body to the airfoil, the second flow body having a recess, an upper trailing edge, and a lower trailing edge, the second flow body being movable between:
  - a retracted position wherein the second flow body at least approximately aerodynamically seals the at least one gap, and wherein the first flow body is located in the recess, the upper trailing edge is positioned proximate to the leading edae of the airfoil to at least approximately aerodynamically seal with the airfoil, and the lower trailing edge is positioned proximate to the leading edge of the airfoil to at least approximately aerodynamically seal with the airfoil; and
  - an extended position where the second flow body is positioned to allow fluid flow through the at least one gap.

12. The method of claim 11 wherein coupling a second flow body to the airfoil to be movable between a retracted and an extended position includes coupling a second flow body to an airfoil to be movable between a retracted position and a first extended position where the second flow body is positioned to allow fluid flow through at least one first gap, and wherein the second flow body is movable to a second extended position where the second flow body is positioned to allow fluid flow through the at least one first gap and to form at least one second gap between the second flow body and the first flow body.

13. The method of claim 11, further comprising positioning at least one sealing device between the second flow body and the leading edge of the airfoil to aid in preventing fluid flow through the at least one gap when the second flow body is in the retracted position.

14. The method of claim 11 wherein coupling a second flow body to the airfoil to be movable between a retracted and an extended position includes coupling the second flow body to the airfoil to be movable between the retracted position and the extended position wherein the second flow body is positioned forward of, below, or both forward of and below the airfoil to form an extension of the leading edge of the airfoil when the second flow body is in the extended position.

15. The method of claim 11 wherein:
- coupling a second flow body includes coupling a second flow body to an airfoil to be movable between a retracted position and a first extended position where the second flow body is positioned to form a passageway having a first distance between the second flow body and the leading edge of the airfoil, the passageway being positioned to affect the air flow through the at least one gap; and
- the second flow body is movable to a second extended position where the passageway has a second distance between the second flow body and the leading edge of the airfoil, the second distance being different than the first distance.

16. A method for making an aerospace vehicle system, comprising:
- fixedly coupling a first flow body to an airfoil to form a first gap between the first flow body and a leading edge of the airfoil;
- movably coupling a second flow body to the airfoil;
- fixedly coupling a third flow body to the leading edge of the airfoil, the third flow body positioned to form a second gap between the first flow body and the third flow body, wherein the second flow body is movable between:
  - a retracted position where the second flow body at least approximately aerodynamically seals the first gap and the second gap; and
  - an extended position where the second flow body is positioned to allow fluid flow through at least one of the first gap and the second gap.

17. The method of claim 16 wherein the extended position includes a first extended postion, and wherein the second flow body is movable among:
- the retracted position;
- the first extended position; and
- a second extended position where the second flow body is positioned to allow fluid flow through the first gap and the second gap, and to form at least one third gap between the second flow body and the third flow body.

18. A method for configuring an aerospace vehicle system, comprising:
- removing at least a portion of a pre-existing leading edge device from an airfoil;
- fixedly coupling a first flow body to the airfoil to form at least one gap between the first flow body and a leading edge of the airfoil; and coupling a second flow body to the airfoil to be movable between:
  a retracted position where the second flow body at least approximately aerodynamically seals the at least one gap; and
  an extended position where the second flow body is positioned to allow fluid flow through the at least one gap.

19. A method for configuring an aerospace vehicle for various phases of flight comprising:
  positioning a leading edge device in a retracted position wherein:
    a second flow body of the leading edge device at least approximately aerodynamically seals a gap between a portion of a first flow body of the leading edge device and a portion of a leading edge of an airfoil, wherein the first flow body is fixedly coupled to the leading edge of the airfoil; and
    the first flow body is located in a recess of the second flow body, an upper trailing edge of the second flow body is positioned proximate to the leading edge of the airfoil to at least approximately aerodynamically seal with the airfoil, and a lower trailing edge of the second flow body is positioned proximate to the leading edge of the airfoil to at least approximately aerodynamically seal with the airfoil; and
  positioning the leading edge device in an extended position wherein the second flow body of the leading edge device is positioned to allow fluid flow through the gap.

20. The method of claim 19 wherein:
  positioning the leading edge device in an extended position includes positioning the leading edge device in a first extended position to form a passageway having a first distance between the second flow body and the leading edge of the airfoil, the passageway being positioned to affect the air flow through the gap; and
  the method further comprises positioning the leading edge device in a second extended position where the passageway has a second distance between the second flow body and the leading edge of the airfoil, the second distance being different than the first distance.

21. The method of claim 19 wherein positioning the leading edge device in an extended position includes positioning the leading edge device in a first extended position to allow fluid flow through a first gap, and wherein the method further comprises positioning the leading edge device in a second extended position to allow fluid flow through the first gap and to allow fluid flow through a second gap between the first flow body and the second flow body.

22. The method of claim 19 wherein positioning the second flow body in the extended position includes positioning the second flow body at least one of forward and below the airfoil to form an extension of the leading edge of the airfoil.

23. The method of claim 19, further comprising operating the aerospace vehicle with the leading edge device in at least one of the retracted and extended positions.

24. An aerospace vehicle system, comprising:
  an airfoil having a leading edge and a spanwise section;
  a first flow body movably coupled to the airfoil; and
  a second flow body movably coupled to the airfoil, the second flow body having a recess, an upper trailing edge, and a lower trailing edge, the first flow body and the second flow body being movable between:
    a retracted position where the first flow body is located in the recess, the upper trailing edae of the second flow body is proximate to and at least approximately aerodynamically sealed with the leading edge of the airfoil above the first flow body across the spanwise section, and the lower trailing edge of the second flow body is proximate to and at least approximately aerodynamically sealed with the leading edge of the airfoil below the first flow body across the spanwise section; and
    an extended position where the first flow body and the second flow body are positioned to interact with a fluid flow.

25. The system of claim 24 wherein the extended position includes at least one of:
  the first flow body and the second flow body being positioned to allow fluid flow between the first flow body and the leading edge of the airfoil; and
  the first flow body and the second flow body being positioned to allow fluid flow between the first flow body and the second flow body.

* * * * *

UNITED STATES PATENT AND TRADEMARK OFFICE
CERTIFICATE OF CORRECTION

PATENT NO. : 7,322,547 B2 Page 1 of 1
APPLICATION NO. : 11/048320
DATED : January 29, 2008
INVENTOR(S) : Konings It is certified that error appears in the above-identified patent and that said Letters Patent is hereby corrected as shown below:

On the title page:

On Page 4, in item (56), under "Other Publications", in column 2, line 12, delete "Aeornautics" and insert -- Aeronautics --, therefor.

On Page 4, in item (56), under "Other Publications", in column 2, line 15, delete "shpe" and insert -- shape --, therefor.

On Page 4, in item (56), under "Other Publications", in column 2, line 21, before "http" insert -- < --.

On Page 4, in item (56), under "Other Publications", in column 2, line 25, before "http" insert -- < --.

On Page 4, in item (56), under "Other Publications", in column 2, line 32, before "http" delete ">" and insert -- < --, therefor.

In column 5, line 53, delete "11a" and insert -- 110a --, therefor.

In column 11, line 54, in Claim 11, delete "edae" and insert -- edge --, therefor.

In column 12, line 53, in Claim 17, delete "postion," and insert -- position, --, therefor.

In column 14, line 22, in Claim 24, delete "edae" and insert -- edge --, therefor.

Signed and Sealed this

Fourteenth Day of October, 2008

JON W. DUDAS
*Director of the United States Patent and Trademark Office*